(12) United States Patent
Jobst

(10) Patent No.: US 10,648,951 B2
(45) Date of Patent: May 12, 2020

(54) CLASSIFICATION OF ULTRASONIC INDICATIONS USING PATTERN RECOGNITION

(71) Applicant: GE Sensing & Inspection Technologies GmbH, Huerth (DE)

(72) Inventor: Matthias Jobst, Huerth (DE)

(73) Assignee: GE Sensing & Inspection Technologies GmbH, Hürth (DE)

( * ) Notice: Subject to any disclaimer, the term of this patent is extended or adjusted under 35 U.S.C. 154(b) by 297 days.

(21) Appl. No.: 15/812,483

(22) Filed: Nov. 14, 2017

(65) Prior Publication Data

US 2019/0145940 A1 May 16, 2019

(51) Int. Cl.
*G01N 29/44* (2006.01)
*G01N 29/04* (2006.01)
*G06K 9/00* (2006.01)

(52) U.S. Cl.
CPC ....... *G01N 29/4454* (2013.01); *G01N 29/043* (2013.01); *G01N 29/4445* (2013.01);
(Continued)

(58) Field of Classification Search
CPC ............. G01N 29/4454; G01N 29/043; G01N 29/4445; G06K 9/00536
(Continued)

(56) References Cited

U.S. PATENT DOCUMENTS 4,435,984 A 3/1984 Gruber
7,299,697 B2 11/2007 Siddu et al.
(Continued)

FOREIGN PATENT DOCUMENTS

CN 105203632 A 12/2015

OTHER PUBLICATIONS

Moura, et al., "Pattern Recognition of Weld Defects in Preprocessed TOFD Signals Using Linear Classifiers", Journal of Nondestructive Evaluation, vol. 23, Issue 4, pp. 163-172.
(Continued)

*Primary Examiner* — Tarun Sinha
(74) *Attorney, Agent, or Firm* — Mintz Levin Cohn Ferris Glovsky and Popeo, P.C.

(57) ABSTRACT

A pattern recognizing ultrasonic testing system and methods for using the same are provided. The system can include an ultrasonic probe and an analyzer. The ultrasonic probe can be configured to acquire ultrasonic measurements from target, where the ultrasonic measurements can contain one or more ultrasonic patterns representing a target characteristic. The analyzer can be in communication with the ultrasonic probe. The analyzer can also be configured to receive the ultrasonic measurements, receive a first classifier configured to identify a predetermined target characteristic based upon one or more predetermined first ultrasonic patterns, examine the received ultrasonic measurements using the first classifier, and identify ultrasonic patterns of the received ultrasonic measurements that correspond to the predetermined ultrasonic patterns as representing the predetermined target characteristic. With pattern recognition, it can be possible to not only identify but distinguish between different target characteristics contained within the received ultrasonic measurements.

13 Claims, 5 Drawing Sheets

(52) U.S. Cl.
CPC ... *G06K 9/00536* (2013.01); *G01N 2291/023* (2013.01); *G01N 2291/044* (2013.01); *G01N 2291/101* (2013.01)

(58) Field of Classification Search
USPC .......................................................... 73/629
See application file for complete search history.

(56) References Cited

U.S. PATENT DOCUMENTS

| | | |
|---|---|---|
| 8,146,429 B2 | 4/2012 | Ume et al. |
| 8,256,296 B2 | 9/2012 | Ume et al. |
| 9,244,043 B2 | 1/2016 | Buechler et al. |
| 2008/0009722 A1* | 1/2008 | Simopoulos ............. A61B 8/08 600/437 |
| 2011/0023609 A1* | 2/2011 | Ume ...................... G01N 29/11 73/600 |
| 2015/0251024 A1* | 9/2015 | Belt ...................... A61B 8/085 600/439 |

OTHER PUBLICATIONS

Neundorf, et al., "Underwater Sensing and Testing with Ultrasound", Offshore Technology Conference, Houston, Texas, May 1-4, 1995.

\* cited by examiner

CLASSIFICATION OF ULTRASONIC INDICATIONS USING PATTERN RECOGNITION

BACKGROUND

In some instances, non-destructive testing (NDT) is a class of analytical techniques that can be used to inspect characteristics of a target, without causing damage, to ensure that the inspected characteristics satisfy required specifications. For this reason, NDT can be used in a number of industries such as aerospace, power generation, oil and gas transport or refining. NDT can be useful in industries that employ structures that are not easily removed from their surroundings (e.g., pipes or welds) or where failures would be catastrophic.

Ultrasonic testing is one type of NDT. Ultrasound is acoustic (sound) energy in the form of waves that have an intensity (strength) which varies in time at a frequency above the human hearing range. In ultrasonic testing, one or more ultrasonic waves can be directed towards a target in an initial pulse. As the ultrasonic waves contact and penetrate the target, they can reflect from features such as outer surfaces and interior defects (e.g., cracks, porosity, etc.). An ultrasonic sensor can acquire ultrasonic measurements, acoustic strength as a function of time, that include these reflected ultrasonic waves.

Subsequently, ultrasonic measurements can be analyzed to determine target characteristics. However, under some circumstances, it can be difficult to identify reflected ultrasonic waves within the ultrasonic measurements. Further, even when reflected ultrasonic waves are identified, existing analyses can provide limited information regarding target characteristics without additional equipment or can require review by specifically trained personnel, which can increase the complexity and cost of ultrasonic testing.

SUMMARY

Under some circumstances, it can be difficult to identify reflected ultrasonic waves within ultrasonic measurements. Further, even when reflected ultrasonic waves are identified, existing analyses can provide limited information regarding target characteristics without additional equipment or can require review by specifically trained personnel, which can increase the complexity and cost of ultrasonic testing. In general, systems and methods are provided for classifying ultrasonic indications using pattern recognition. The ability to perform pattern recognition can be trained to improve the classification accuracy.

Methods for identifying characteristics of a target are provided. In one embodiment, the method can include providing an analyzer configured to connect with one or more ultrasonic sensors. The method can also include receiving, at the analyzer from a memory, data including ultrasonic measurements of a target. The received ultrasonic measurements can be acquired by the one or more ultrasonic sensors and represent an incident ultrasonic signal reflected from a target. The method can further include receiving, at the analyzer from the memory, a classifier. The classifier can be configured to recognize an ultrasonic pattern representing a target characteristic from the received ultrasonic measurements. The method can additionally include comparing, using the analyzer and the received classifier, at least a portion of the received ultrasonic measurements to the one or more ultrasonic patterns of the received classifier. The method can additionally include the analyzer recognizing ultrasonic patterns contained within the received ultrasonic measurements that substantially match the one or more ultrasonic patterns of the received classifier to identify the target characteristic. The method can further include the analyzer providing the received ultrasonic measurements and the identified target characteristic.

In another embodiment, at least one of the receiving, comparing, recognizing, and providing can be performed by at least one data processor.

In another embodiment, the memory can be remote from the ultrasonic sensor.

In another embodiment, the method can further include generating, by the one or more ultrasonic sensors, the incident ultrasonic signal and measuring, by the one or more ultrasonic sensors, the reflected incident ultrasonic signal.

In another embodiment, the received ultrasonic measurements can include at least one of ultrasonic amplitude as a function of time and Fourier transformations thereof.

Embodiments of the target characteristics can have a variety of configurations. In one aspect, the target characteristic can be a region within the target having a material property. In another aspect, the target characteristic can be an absence of a region within the target having a material property. In a further aspect, the target characteristic can be a geometric characteristic of the target. Methods for training a classifier are provided. In one embodiment, the method can include receiving, at a trainer from a memory, data including ultrasonic measurements of a target. The ultrasonic measurements can be acquired by one or more ultrasonic sensors and representing an incident ultrasonic signal reflected from a target. The method can also include receiving, at the trainer from the memory, one or more classifiers for a target characteristic. Each classifier can be configured to generate an estimated identification of the target characteristic based upon recognition of one or more ultrasonic patterns from the received ultrasonic measurements. The method can further include receiving, at the trainer, a known identification of the target characteristic. The method can additionally include using the trainer to determine, for each received classifier, an error between the estimated identification of the target characteristic generated by the received classifier and the known identification of the target characteristic. The method can also include using the trainer to select the received classifier corresponding to the lowest determined error.

In another embodiment, at least one of the receiving, determining, and selecting can be performed by at least one data processor.

In another embodiment, the received ultrasonic measurements can include at least one of ultrasonic amplitude as a function of time and Fourier transformations thereof.

In another embodiment, the memory can be remote from the trainer.

Embodiments of the target characteristics can have a variety of configurations. In one aspect, the target characteristic can be a region within the target having a material property. In another aspect, the target characteristic can be an absence of a region within the target having a material property. In a further aspect, the target characteristic can be a geometric characteristic of the target.

In one embodiment, an ultrasonic testing system is provided and it can include an ultrasonic sensor and an analyzer. The ultrasonic sensor can be configured to acquire data including ultrasonic measurements representing an incident ultrasonic signal reflected from the target. The analyzer can be communication with the ultrasonic sensor and it can be configured to receive the ultrasonic measurements from the ultrasonic sensor, receive a first classifier configured to recognize an ultrasonic pattern representing a target characteristic from the received ultrasonic measurements, compare, using the received first classifier, at least a portion of the received ultrasonic measurements to the one or more ultrasonic patterns of the received first classifier, and recognize ultrasonic patterns contained within the received ultrasonic measurements that substantially match the one or more ultrasonic patterns of the received first classifier to identify the target characteristic.

In another embodiment, the system can further include a display in communication with the analyzer that can be configured to display the received ultrasonic measurements and the identified target characteristic.

In another embodiment, the system can include a trainer in communication with the analyzer. The trainer can be configured to receive the ultrasonic measurements from the analyzer. The trainer can also be configured to receive, from a database, one or more second classifiers that are different from the first classifier. Each of the second classifiers can be configured generate an estimated identification of the target characteristic based upon recognition of the one or more ultrasonic patterns from the received ultrasonic measurements. The trainer can additionally be configured to receive a known identification of the target characteristic. The trainer can also be configured to determine, for each of the second classifiers, an error $e_1$ between the estimated identification of the target characteristic and the known identification of the target characteristic. The trainer can be further configured to determine an error $e_2$ between the identification of the target characteristic for the first classifier and the known identification of the target characteristic. The trainer can be additionally configured to update the first classifier with the second classifier having the error $e_1$ when the error $e_1$ is less than the error $e_2$.

In another embodiment, the received ultrasonic measurements can include at least one of ultrasonic amplitude as a function of time and Fourier transformations thereof.

Embodiments of the target characteristics can have a variety of configurations. In one aspect, the target characteristic can be a region within the target having a material property. In another aspect, the target characteristic can be an absence of a region within the target having a material property. In a further aspect, the target characteristic can be a geometric characteristic of the target.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

When ultrasonic waves pass through a material, they can reflect from surfaces of the material, such as outer surfaces and interior changes of material properties like those caused by defects (e.g., cracks or pores). Different material features, such as geometric boundaries (outer surfaces) and regions having predetermined material properties (defects), can reflect ultrasonic waves in different ways. Some material features can reflect ultrasonic waves better than others, and the strength of the reflected ultrasonic waves can vary. Material features can also be at different distances from an ultrasonic detector and the time a reflected ultrasonic wave reaches the detector can vary. Thus, ultrasonic testing systems have been developed to measure and analyze the strength and time behavior of reflected ultrasonic waves to obtain information about these material features. Some ultrasonic testing systems can measure reflected ultrasonic waves by "listening" for acoustic waves that exceed a certain strength during certain time windows. However, if reflected ultrasonic waves do not appear in one of these time windows and/or if they are mixed with other acoustic waves (noise), they can be missed. Additionally, this manner of analysis may not take into account the shape of the reflected ultrasonic waves and it can require additional analysis to determine what material feature a given reflected ultrasonic wave represents. Accordingly, improved analyses for ultrasonic testing are provided that use pattern recognition. Specific patterns of reflected ultrasonic waves can be looked for in ultrasonic measurements. By using patterns for known material features, ultrasonic measurements can be used to determine the presence or absence of these material features.

Embodiments of ultrasonic sensing systems and corresponding methods for analyzing ultrasonic measurements using pattern recognition are discussed herein. However, embodiments of the disclosure can be employed for analysis of other measurements without limit.

Figure 1:
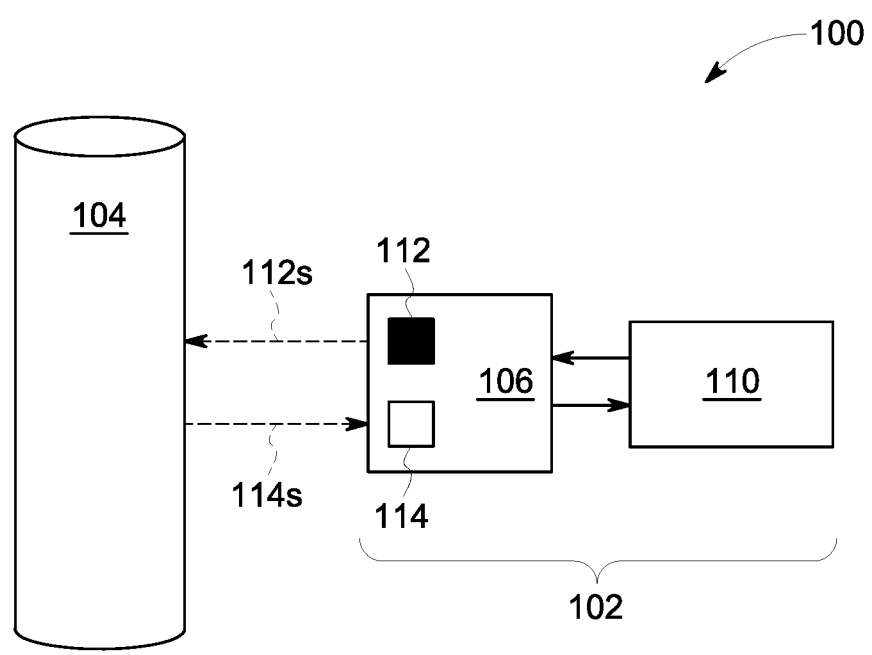
FIG. 1 is a diagram illustrating one exemplary embodiment of an operating environment including a pattern recognizing ultrasonic testing system having an ultrasonic probe and a analyzer.

FIG. 1 illustrates one exemplary embodiment of an operating environment 100 containing a pattern recognizing ultrasonic testing system 102 and a target 104. The pattern recognizing ultrasonic testing system 102 can include an ultrasonic sensor 106 and an analyzer 110. The ultrasonic sensor 106 can include an ultrasonic generator 112 and an ultrasonic detector 114. The ultrasonic generator 112 can be positioned within a housing of the ultrasonic sensor 106 and it can be configured to generate ultrasonic waves that penetrate the target 104 at a selected angle and strength (e.g., ultrasonic amplitude or intensity), referred to herein as incident ultrasonic signals 112s. The ultrasonic detector 114 can also be positioned within the housing of the ultrasonic sensor 106 and it can be configured to detect ultrasonic waves reflected back to the ultrasonic sensor 106 from the target 104, referred to herein as return ultrasonic signals 114s.

In use, the ultrasonic sensor 106 can be positioned proximate to the target 104 (e.g., in contact with or near the target 104) for measuring return ultrasonic signals 114s. As discussed in greater detail below, the analyzer 110 can be configured to receive the return ultrasonic signals 114s and it can classify indications contained within the return ultrasonic signals 114s using pattern recognition. Classifications can include, but are not limited to, the presence of an indication, the absence of an indication, and/or determination of specific types of target characteristics represented by identified indications. In other embodiments, the analyzer 110 can be trained to improve its pattern recognition ability. In this manner, target characteristics can be more accurately determined from ultrasonic measurements.

Figure 2:
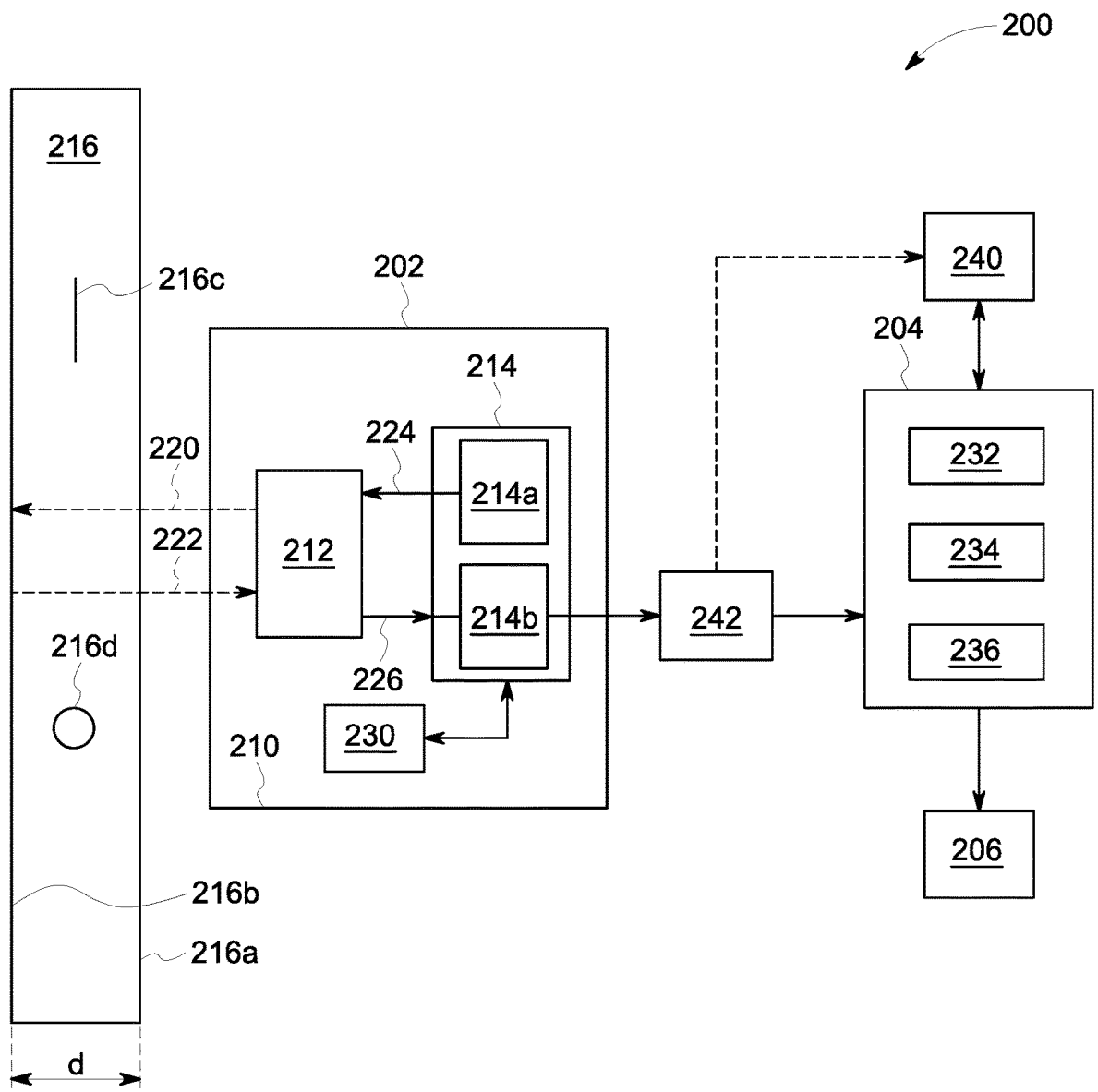
FIG. 2 is a schematic illustration of an embodiment of the pattern recognizing ultrasonic testing system of FIG. 1.

FIG. 2 is a schematic illustration of one exemplary embodiment of a pattern recognizing ultrasonic testing system 200 that includes an ultrasonic probe 202 in electrical communication with an analyzer 204 and a display 206. The ultrasonic probe 202 can include a housing 210 that contains one or more ultrasonic transducers 212 in communication with a transceiver 214. As discussed in greater detail below, the ultrasonic probe 202 can be configured to direct incident ultrasonic signals 220 towards a target 216 and acquire measurements of acoustic energy including the return ultrasonic signals 222. The return ultrasonic signals 222 can include ultrasonic wave patterns (ultrasonic intensity as a function of time) that are related to characteristics of the target 216, referred to herein as indications. The analyzer 204 can be configured to process the ultrasonic measurements to classify indications contained therein. The display 206 can be configured to display the ultrasonic measurements and attendant classifications.

The target 216 can be any structure through which incident and return ultrasonic signals 220, 222 can propagate. The target 216 can include one or more interior and/or exterior surfaces from which portion of the incident ultrasonic signals 220 can be reflected as the return ultrasonic signals 222. As shown in FIG. 2, non-limiting examples of exterior surfaces can include a first surface 216a positioned nearest to the ultrasonic probe 202 and a second surface 216b separated from the first surface 216a by a distance d (e.g., a thickness dimension). Indications related to the surfaces 216a, 216b can be used to determine geometric characteristics of the target 216 (e.g., distance d) and they can be interchangeably referred to as geometric indications. Interior surfaces can include defects, regions having predetermined material properties that are different than their surroundings. Non-limiting examples of defects can include cracks 216c and pores 216d, as well as regions having different chemical composition or and/or phase from their surroundings. Indications related to defects can be used to determine defect characteristics of the target 216 (e.g., shape, size, relative location, type, etc.) and they can be interchangeably referred to as defect indications.

The ultrasonic transducers 212 can be configured to generate the incident ultrasonic signals 220 and detect ultrasonic energy including the return ultrasonic signals 222. As an example, each of the ultrasonic transducers 212 can include a piezoelectric material. When electrical pulses are applied to electrodes of the ultrasonic transducer 212 (input signal 224), the piezoelectric materials undergo a physical deflection which generates the incident ultrasonic signals 220.

Figure 3:
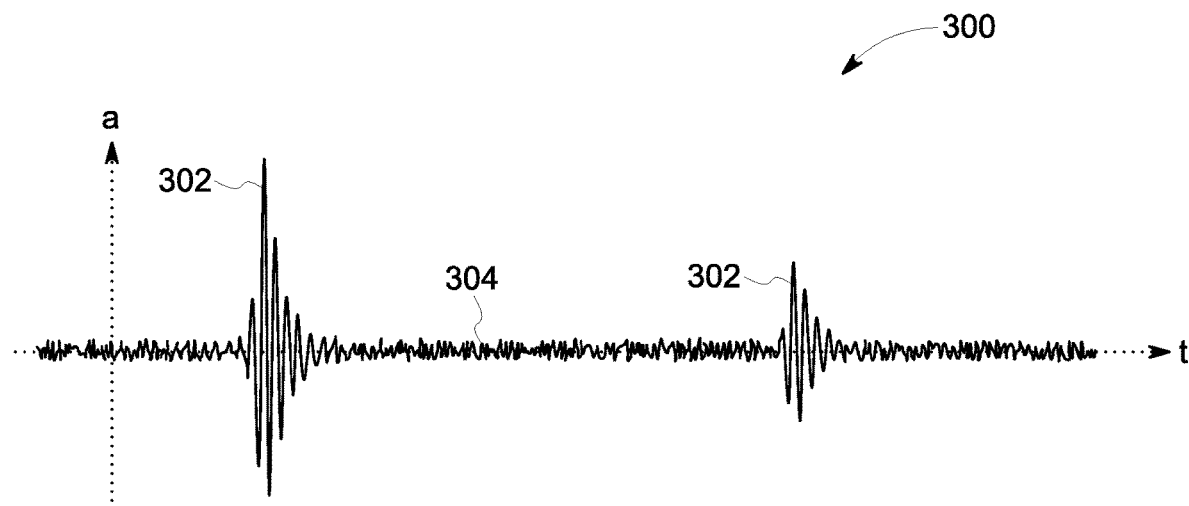
FIG. 3 is a plot of ultrasonic amplitude as a function of time illustrating a measured ultrasonic signal including two ultrasonic return signals or indications representing one or more target characteristics.

When ultrasonic energy, including the return ultrasonic signals 222, is received at the ultrasonic transducers 212, a voltage difference is produced by the piezoelectric material that can be measured and output to the transducer, measured ultrasonic signal 226. FIG. 3 illustrates an example of the measured ultrasonic signal 226 in the form of an amplitude-time plot 300, with time t represented on the horizontal axis and ultrasonic amplitude a represented on the vertical axis. As shown, the measured ultrasonic signal 226 can include all acoustic energy measured by the ultrasonic transducers 212, including peaks 302 (indications), as well as noise 304.

The transceiver 214 can be configured to control the input signal 224 for generation of the incident ultrasonic signals 220. As shown, the transceiver 214 is in electrical communication with the ultrasonic transducer 212 and it includes a transmission portion 214a and a receiver portion 214b. The transmission portion 214a can include a pulser (not shown) configured to transmit electrical pulses to the ultrasonic transducer 212 according to a predetermined interrogation scheme. In certain embodiments, the interrogation scheme can be stored in a memory 230 in communication with the transceiver 214. The receiver portion 214b can include an amplifier (not shown) configured to adjust a strength of the measured ultrasonic signal 226.

While the ultrasonic probe 202 is illustrated with a single ultrasonic transducer 212 in FIG. 2, other embodiments of the ultrasonic probe can include two or more ultrasonic transducers. In further embodiments (not shown), the two or more ultrasonic transducers can be arranged in an array separated from one another by a predetermined distance. Each ultrasonic transducer can receive instructions for generating ultrasonic signals that, taken together, provide an interrogation scheme for probing the target. The interrogation scheme can control the timing and strength of electrical pulses applied to each of the ultrasonic transducers, causing ultrasonic signals generated by the ultrasonic transducers to interfere constructively and/or destructively In this manner, incident ultrasonic signal can be steered with respect to the target. Further details regarding ultrasonic probes including arrays of ultrasonic transducers are discussed in U.S. Pat. No. 9,244,043, the entirety of which is incorporated by reference herein.

The analyzer 204 can be any computing device employing a general purpose or application-specific processor 232. In either case, the analyzer 204 can include a memory 234 for storing instructions and algorithms for classifying ultrasonic indications contained within the measured ultrasonic signal 226 using pattern recognition, as discussed in greater detail below. The processor 232 can include one or more processing devices, and the memory 234 can include one or more tangible, non-transitory, machine-readable media collectively storing instructions executable by the processor 232 to perform the methods described herein. A power supply 236 (e.g., electrical outlet, electrical generator, battery, etc.) can provide power to the analyzer 204. In certain embodiments, the analyzer 204 can be a field programmable gate array (FPGA).

The analyzer 204 can employ pattern recognition to classify return ultrasonic signals 222 (indications) that are contained within the measured ultrasonic signal 226 and thereby determine characteristics of the target 216. In general, classification can be a process that takes an input (e.g., an observation) and, using a classifier, determines the set of categories or labels to which the input belongs. In the context of ultrasonic testing, the input is the measured ultrasonic signal 226 and the classification is the target characteristic. The exact form of the classifier can depend upon the information contained within input and the classifications that are desired.

In one embodiment, the analyzer 204 can employ a classifier configured to determine whether or not an indication exists within the measured ultrasonic signal 226. This classification is an example of a "yes/no" classifier and can be mathematically represented as follows:

$$y_i = \theta_i x_i$$

$$y = \sum_{i=0}^{N} y_i$$

where N is the number of inputs that are classified, i is an integer ranging from 0 to N, $x_i$ is the $i^{th}$ input, and $\theta_i$ is the $i^{th}$ classifier, $y_i$ is the classification for the $i^{th}$ input $x_i$, and y is an overall classification result for all $x_i$.

N can be thought of as the number of inputs used to determine the classification y. The measured ultrasonic signal 226 can be divided into N inputs $x_i$, each extending over a predetermined time range T. Assuming classification begins at time t=0, input $x_1$ is the portion of measured ultrasonic signal 226 extending from time t=0 to T, input $x_2$ is the portion of measured ultrasonic signal 226 extending from time t=T to 2T, and so on through $x_N$.

An $i^{th}$ classification $y_i$ results from operation of an $i^{th}$ classifier $\theta_i$ on an $i^{th}$ input $x_i$. Each classifier $\theta_i$ can be configured to compare the $i^{th}$ input $x_i$ to a predetermined pattern and output an $i^{th}$ classification $y_i$. As an example, a first classification $y_1$ results from operation of a first classifier $\theta_1$ on the first input $x_1$, a second classification $y_2$ results from operation of a second classifier $\theta_2$ on the second input $x_2$, etc. This process can be continued to determine $y_1$ through $y_N$.

The overall classification y is the sum of classifications $y_i$ determined from $x_i$ over i=0 to N. In an embodiment, each classifier $\theta_i$ can be configured to output the classification $y_i$ such that the overall classification y is above a predetermined value (e.g., 50%) when the measured ultrasonic signal 226 contains the predetermined pattern.

In certain embodiments, the measured ultrasonic signal 226 (input x) and the classification y can be presented to a user (e.g., an inspector) in real-time. As an example, the measured ultrasonic signal 226 (input x) and the classification y can be output from the analyzer 204 to the display 206.

Embodiments of the pattern recognizing ultrasonic testing system 200 can adopt other configurations, without limit. In one aspect, measured ultrasonic signals 226 can be stored (e.g., in a data storage device 240) and later retrieved for classification by the analyzer 204. In another aspect, measured ultrasonic signals 226 (input x) and/or classifications y can be output to the data storage device 240 and later retrieved for presentation to a user by the display 206.

Figure 4:
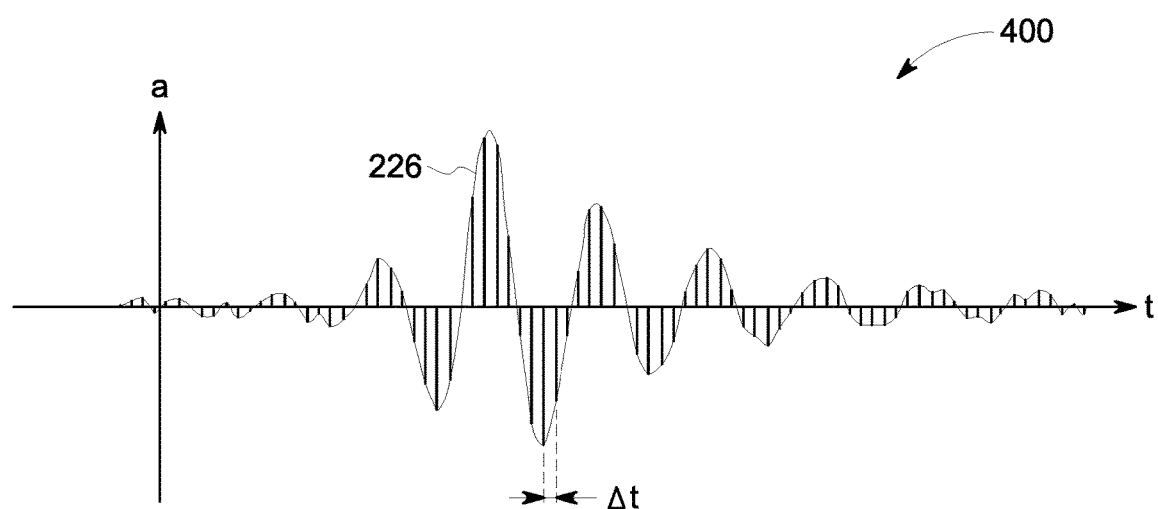
FIG. 4 is a plot of ultrasonic amplitude as a function of time illustrating sampling of a measured ultrasonic signal.

Further embodiments of the pattern recognizing ultrasonic testing system 200 can perform classification on a digital form of the measured ultrasonic signals 226. As an example, measured ultrasonic signals 226 can be transmitted to an analog to digital (A/D) converter 242 prior to use by the analyzer 204 for classification. FIG. 4 illustrates sampling of the measured ultrasonic signals 226 in another amplitude-time plot 400, where discrete values of the amplitude a of the measured ultrasonic signal 226 are sampled at predetermined time intervals Δt. Each amplitude value and its corresponding sample time can represent inputs $x_i$ and they can be transmitted to the analyzer 204 for use in classification, as discussed above.

Figure 5:
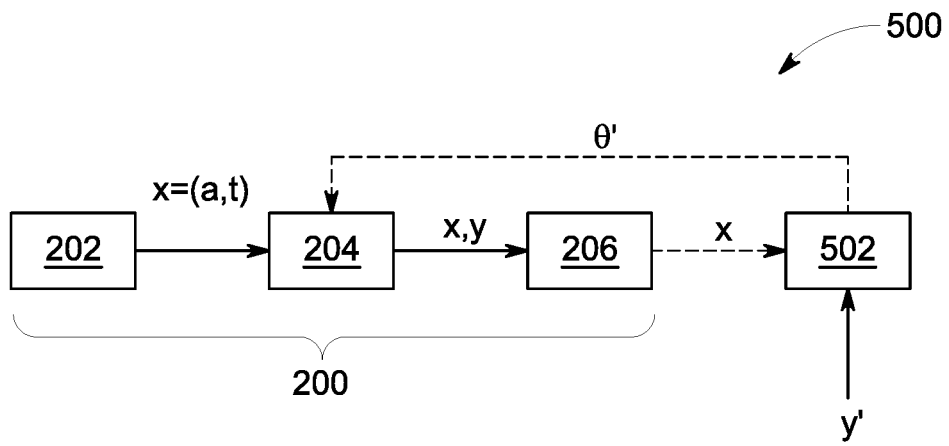
FIG. 5 is a diagram illustrating another exemplary embodiment of a pattern recognizing ultrasonic testing system including the system of FIG. 2 in combination with a trainer.

FIG. 5 is a schematic illustration of another exemplary embodiment of a pattern recognizing ultrasonic testing system 500 that includes the pattern recognizing ultrasonic testing system 200 and a trainer 502. In certain embodiments, the trainer 502 can be a computing device, as discussed above in regards to the analyzer 204.

As shown in FIG. 5, a training input and a reference classification y' can be provided to the trainer 502. The training input can be the measured ultrasonic signal 226, input x. As further shown, the training input x can be transmitted to the trainer 502 from the analyzer 204 (e.g., via the display 206). However, in alternative embodiments, the measured ultrasonic signal 226, can be stored (e.g., in data storage device 240) and retrieved by the trainer. The reference output y' can be input by a skilled user and/or from a training data set.

The trainer 502 can receive a set of possible classifiers $\theta_j$, where each $\theta_j$ can be configured to provide an estimated classification $Y_j$. The trainer 502 can be configured to identify a classifier the set of possible classifiers $\theta_j$ that minimizes an error between its classification result $Y_j$ and the reference classification y'. In certain embodiments, this can be represented as a cost function minimization as follows:

$$\min_{\theta_j}(J_{cost}(x, y'))$$

where $\theta_j$ is the set of possible classifiers and $$\min_{\theta_j}$$

is the minimization of $J_{cost}$ for x and y'. For each $\theta_j$ of the set of $\theta_j$ possible classifiers, an error $e_1$ between its estimated identification of the target characteristic $Y_j$ and the known identification of the target characteristic, reference classification y', can be determined. An error $e_2$ between the identification of the target characteristic for the classifier θ utilized by the analyzer 204, classification y, and the known identification of the target characteristic y' can also be determined. In certain embodiments, when the trainer 502 identifies one of the possible classifiers $\theta_j$ that has an error $e_1$ that is less than the error $e_2$, that classifier, now referred to as θ', can be provided to the analyzer 204 to replace the current classifier θ. This substitution can reflect that the newly trained classifier θ' provides better classification than the classifier θ. The analyzer 204 can subsequently use the updated classifier θ' to achieve improved classifications.

Besides training a classifier on detection of individual indications, it can be possible to train the classifier on groups of indications. As discussed below, current ultrasonic inspection of spot welds can use the number of indications to determine a specific type of bad weld. A classifier trained on those types of indications occurring in bad spot welds can produce similar results and/or be trained to accommodate known variations in weld responses.

While examples of relatively simple classifiers have been discussed for clarity, different classifiers can be applied to pattern recognition without limit. As discussed below, these classifiers can fall into one of two categories, supervised and unsupervised learning.

In supervised learning, training is performed using a pre-defined dataset. The training of a yes/no classifier discussed above is one example, where the pre-defined dataset is the reference classification y'. However, more complex classifiers can be used to distinguish between different types of indications. As an example, internal defects such as cracks and porosity can produce different indications in return ultrasonic signals 222. To distinguish between these types of indications, more than one classifier can be used and/or trained. Classification in this manner can provide more feedback on the type of indication as compared to existing threshold approaches.

In another example of supervised learning, neural networks can be used for classification. Neural networks can possess higher complexity than classifiers but they can be used to solve more complex pattern recognition problems.

In unsupervised learning, the trainer 502 can be given the measured ultrasonic signals 226 and automatically find patterns and relationships for the indications. Examples of unsupervised learning can include, but are not limited to, clustering and outlier detection. In a clustering approach, common characteristics can be clustered together. By identifying the proper characteristics for clustering, meaningful clusters can be assembled. In an outlier detection approach, certain characteristic measurements that lie outside the expected can be identified.

Pre-Processing

Classifier training can be facilitated by pre-processing operations occurring prior to classification and training. Examples of pre-processing operations can include, but are not limited to, sampling, sampling window size, normalization, and frequency shifting, as discussed below.

Sampling

As discussed above, the measured ultrasonic signal 226 can be digitized by the A/D converter 242 prior to classification by the analyzer 204. In order to achieve accurate classification results, it can be beneficial to utilize the same sampling between classification and training. To produce a classifier that is less sensitive to sampling, variations in over sampling or under sampling can be introduced in the training input.

In some instances, a sampling is applied together with filtering to ensure that the Nyquist criteria is met it can introduce artifacts not present in the original signal. (The Nyquist criteria describes the maximum frequency $f_{max}$ that can be sampled without aliasing for a sampling rate $f_{samp}$ and is given by $f_{max}=0.5\ f_{samp}$) It can be desirable to avoid artifacts that impact the classification, as they can reduce the classification accuracy.

Sampling Window Size

As further discussed above, classification can employ N samples, each having a predetermined window size. The size of N decreases with increasing window size and the size of N increases with decreasing window size. In one aspect, the size of N can impact the computational complexity of the classifier and the effort needed to train it. In another aspect, the window size should be large enough to fit the largest possible indications. If the window size is too short, some indications cannot be detected as a whole. The size of the indications can depend on material properties of the target 216 as well as properties of the ultrasonic probe 202 and can be application specific. Window size can be adjusted in view of over or under sampling considerations.

Normalization

When ultrasonic waves travel through a material, their intensity decreases as acoustic energy is lost to the material. This phenomenon, referred to as attenuation, can reduce the amplitude a of the measured ultrasonic signals 226 by an amount based upon the distance traveled through the material. If attenuation is left uncorrected, it can introduce errors into classification due to unexpected amplitude variations.

One approach to correct for ultrasonic attenuation is normalization. Normalization can be implemented on amplitude of the measured ultrasonic signals 226 across each classification window according to the following:

$$x_{norm,i} = \frac{x_i}{\max_N(x_i)}$$

where $x_{norm,i}$ is the $i^{th}$ normalized input, $x_i$ is the original $i^{th}$ input, and $$\max_N(x_i)$$

is the maximum $x_i$ over all N. In other embodiments, different normalizations can be used if they can impact the classification in a positive way.

Frequency Shifting

The frequency of the measured ultrasonic signal 226 can be dependent upon the ultrasonic testing environment and can be a parameter that is part of the classifier implemented by the analyzer 204. In one aspect, the center frequency of the of the measured ultrasonic signal 226 can depend on the ultrasonic probe 202. A higher center frequency can resolve indications better but it can also exhibit inferior penetration. In another aspect, under some circumstances the material from which the target 216 is formed can alter the frequency of return ultrasonic signals 222 contained within the measured ultrasonic signal 226.

In other embodiments, there can be ultrasonic testing environments in which frequency does not contain important information for classification. Under these circumstances, techniques can be used to make the classification less dependent on the frequency of the measured ultrasonic signal 226.

Shifting the frequency of the measured ultrasonic signal 226 can be achieved by modulation or going through a Fourier transformation and shifting the frequency components on the transformed signal. Alternatively, the analyzer can employ classifiers that are configured to classify measured ultrasonic signals in the frequency domain directly. In this case, care should be taken to ensure that components introduced by windowing do not interfere with the classification.

A variety of ultrasonic testing applications can benefit from classification of indications, including axle inspection, weld inspection, spot weld inspection, and testing machines, as discussed below.

Axle Inspection

The inspection of railroad axles is a task in servicing trains. Axles can be shaped in a specific way that creates geometric indications and/or returns ultrasonic signals 222 that correspond to geometric features, when tested ultrasonically. These geometric indications can be suppressed by proper definition of ultrasound parameters. This can be beneficial in circumstances where target characteristics of interest are defects, not geometry. However, under some circumstances, it can be difficult to eliminate geometric indications.

Geometric indications can be deterministic in their behavior and can lend themselves to classifier training in ways that allow classification of both geometric and non-geometric (defect) indications. In one aspect, classifiers can be trained on the specific location and shape of geometric indications within measured ultrasonic signals 226. Deviations in the shape or location of an indications from an expected geometric indication can be used to determine potential defect indications. In another aspect, classifiers can be trained to distinguish between geometric and defect indications, as their shape is different.

Fully automated processes may not be possible in the context of axle inspection, as the ultrasonic probe 202 can require pushing or turning. However, even a partially automated system employing indication classification can indicate potential issues and help to focus an inspector on a few critical issues.

It can be possible to increase a probability of detection (POD) as indications close to geometrical indications can be highlighted and therefore less likely to be missed by an inspector.

Weld Inspection

Ultrasonic testing can also be used for inspection of welds. Weld inspection can often be performed by skilled inspectors manually or assisted by robotic crawlers. Despite its ubiquity, there can be significant challenges involved in weld inspection. In one aspect, the weld may need to be located within the structure being inspected. In another aspect, indications in welds can be due not only to defects but the root or the cap of weld can also produce geometric indications. In a further aspect, weld indications may need to be determined in regards to their severity.

Using a classifier for weld inspection can help in a number of ways. In one aspect, with the right classifier, it can be possible to determine the type of indication. As a result, it can be possible to resolve whether an indication is due to a crack, porosity, and/or lack of fusion. Furthermore, as discussed above, the distinction between geometrical and other indications can be used to improve the POD, as well as support automated or semi-automated inspection.

Spot Welds

Spot welds can be used in the construction of automobile bodies to bond two or three plies of plate. In some instances, an important measurement is the diameter of the bond. To distinguish between bonding and non-bonding, current approaches can count a number of indications that appear close together in time. In contrast, a classifier-based ultrasonic inspection can train the classifier on the pattern of closely spaced indications, which can provide more accurate detection.

Testing Machines

The field of testing machines is a large field with a multitude of inspection tasks. Currently, the results of such inspection can be presented in the form of locatable indications determined by thresholds. Applying classifiers that can distinguish more than one defect can help in controlling production processes better. As an example, wrinkles could be detected in composite plies by the patterns of indications resulting from these wrinkles.

Figure 6:
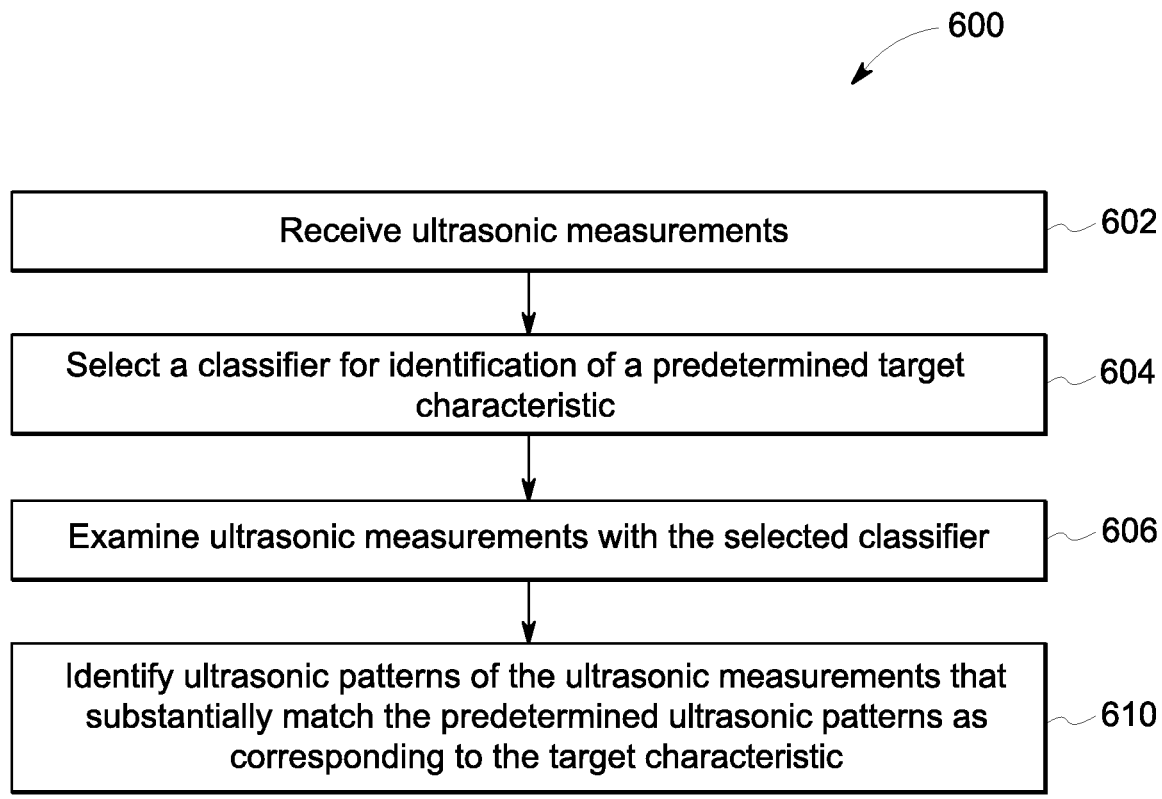
FIG. 6 is a flow diagram illustrating an exemplary embodiment of a method for classifying ultrasonic indications of a target using recognition of ultrasonic patterns.

FIG. 6 is a flow diagram illustrating one exemplary embodiment of a method 600 for ultrasonic identification of a characteristic of a target (e.g., target 216). As shown, the method 600 can include operations 602-610.

In operation 602, ultrasonic measurements of the target 216 can be received. As an example, the ultrasonic measurements can be received by the analyzer 204 from the ultrasonic probe 202. As another example, the ultrasonic measurements can be retrieved by, or provided to, the analyzer 204 from a data storage device (e.g., 240). In certain embodiments, the ultrasonic measurements can include one or more ultrasonic patterns that represent a target characteristic. In other embodiments, one or more ultrasonic patterns representing a target characteristic can be absent from the ultrasonic measurements.

In operation 604, a classifier for a target characteristic can be selected. The classifier can be configured to identify the target characteristic based upon one or more predetermined ultrasonic patterns.

In operation 606, the measured ultrasonic measurements can be examined using the selected classifier. Ultrasonic patterns contained within the ultrasonic measurements that substantially match the one or more predetermined ultrasonic patterns can be identified as corresponding to the target characteristic in operation 610.

Figure 7:
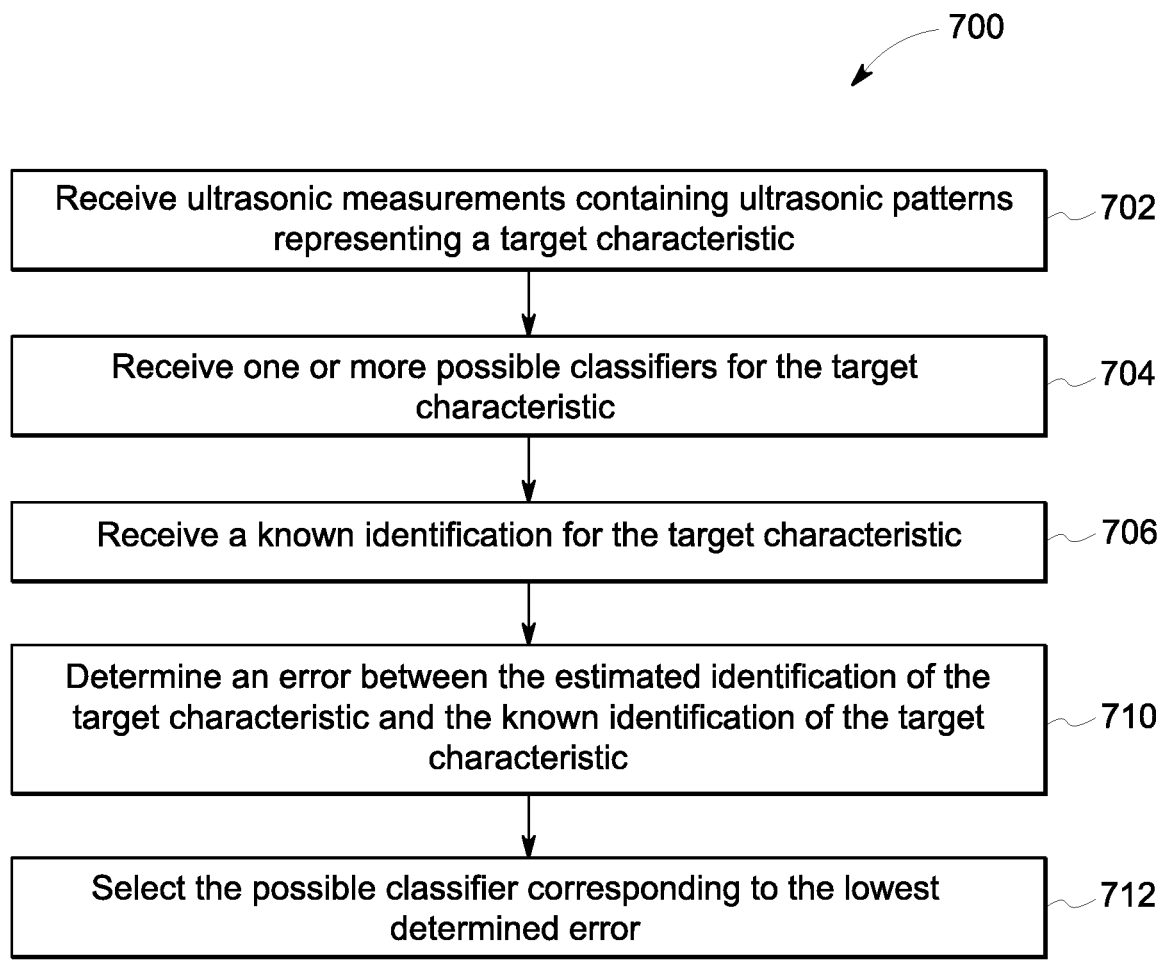
FIG. 7 is a flow diagram illustrating an exemplary embodiment of a method for selecting a classifier for ultrasonic testing.

FIG. 7 is a flow diagram illustrating one exemplary embodiment of a method 700 for selecting a classifier for ultrasonic testing. As shown, the method 700 can include operations 70-712.

In operation 702, ultrasonic measurements of a target can be received. As an example, the ultrasonic measurements can be received by the trainer 502. In certain embodiments, the ultrasonic measurements can include one or more ultrasonic patterns representing a target characteristic.

In operation 704, one or more possible classifiers (e.g., $\theta_j$) for the target characteristic are received. The one or more classifiers $\theta_i$ can be configured to generate an estimated identification of the target characteristic (e.g., classification $Y_j$) based upon the one or more ultrasonic patterns. As an example, the one or more classifiers $\theta_j$ can be retrieved by, or provided to, the trainer 502 from a data storage device (e.g., 240).

In operation 706, a known identification for the target characteristic can be received. As an example, known identification can be the reference classification y' and it can be received by the trainer 502 from input by a skilled user and/or from a training data set.

In operation 710, for each possible classifier $\theta_j$, an error between the estimated identification of the target characteristic (classification $Y_j$) and the known identification of the target characteristic (classification y') can be determined. In operation 712, the possible classifier corresponding to the lowest determined error can be selected (e.g., $\theta'$).

The methods 600 and 700 have been described in connection with the pattern recognizing ultrasonic testing system 200 of FIG. 2. However, the methods 600, 700 are not limited to use with the pattern recognizing ultrasonic testing system 200 and they can be employed with any ultrasonic testing apparatus. In certain aspects, embodiments of the methods 600, 700 can include greater or fewer operations than illustrated in FIGS. 6-7 and can be performed in a different order than illustrated in FIGS. 6-7.

Exemplary technical effects of the methods, systems, and devices described herein include, by way of non-limiting example, improved classification of ultrasonic indications using pattern recognition. Using pattern recognition to register ultrasonic echoes instead of gates can allow different types of defects to be distinguished. Partial or full automation of defect recognition can also be achieved, reducing or eliminating the need for human interaction during ultrasonic inspection. After target characteristics are identified, this information can be utilized to determine whether the target should be kept in service or replaced.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method for identifying characteristics of a target, the method comprising:
   providing an analyzer configured to connect with one or more ultrasonic sensors;
   receiving, at the analyzer from a memory, data including ultrasonic measurements of a target, the received ultrasonic measurements being acquired by the one or more ultrasonic sensors and representing an incident ultrasonic signal reflected from a target;
   receiving, at the analyzer from the memory, a first classifier configured to recognize an ultrasonic pattern representing a target characteristic from the received ultrasonic measurements;
   comparing, using the analyzer and the received classifier, at least a portion of the received ultrasonic measurements to the one or more ultrasonic patterns of the received first classifier;
   recognizing, by the analyzer, ultrasonic patterns contained within the received ultrasonic measurements that substantially match the one or more ultrasonic patterns of the received first classifier to identify the target characteristic; and
   providing, by the analyzer, the received ultrasonic measurements and the identified target characteristic to a trainer;
   receiving, by the trainer from a database, one or more second classifiers that are different from the first classifier, wherein each of the second classifiers is configured generate an estimated identification of the target characteristic based upon recognition of the one or more ultrasonic patterns from the received ultrasonic measurements;
   receiving, by the trainer, a known identification of the target characteristic;
   determining by the trainer for each of the second classifiers, an error $e_1$ between the estimated identification of the target characteristic and the known identification of the target characteristic;
   determining, by the trainer, an error $e_2$ between the identification of the target characteristic for the first classifier and the known identification of the target characteristic; and
   updating, by the trainer, the first classifier with the second classifier having the error $e_1$ when the error $e_1$ is less than the error $e_2$.

2. The method of claim 1, wherein at least one of the receiving, comparing, recognizing, and providing is performed by at least one data processor.

3. The method of claim 1, wherein the memory is remote from the ultrasonic sensor.

4. The method of claim 1, further comprising generating, by the one or more ultrasonic sensors, the incident ultrasonic signal and measuring, by the one or more ultrasonic sensors, the reflected incident ultrasonic signal.

5. The method of claim 1, wherein the received ultrasonic measurements comprise at least one of ultrasonic amplitude as a function of time and Fourier transformations thereof.

6. The method of claim 1, wherein the target characteristic is a region within the target having a material property.

7. The method of claim 1, wherein the target characteristic is an absence of region within the target having a material property.

8. The method of claim 1, wherein the target characteristic is a geometric characteristic of the target.

9. An ultrasonic testing system, comprising:
   an ultrasonic sensor configured to acquire data including ultrasonic measurements representing an incident ultrasonic signal reflected from the target;
   an analyzer in communication with the ultrasonic sensor and configured to,
      receive the ultrasonic measurements from the ultrasonic sensor,
      receive a first classifier configured to recognize an ultrasonic pattern representing a target characteristic from the received ultrasonic measurements,
      compare, using the received first classifier, at least a portion of the received ultrasonic measurements to the one or more ultrasonic patterns of the received first classifier,
      recognize ultrasonic patterns contained within the received ultrasonic measurements that substantially match the one or more ultrasonic patterns of the received first classifier to identify the target characteristic,
   a trainer in communication with the analyzer and configured to:
      receive the ultrasonic measurements from the analyzer;
      receive, from a database, one or more second classifiers that are different from the first classifier, wherein each of the second classifiers is configured generate an estimated identification of the target characteristic based upon recognition of the one or more ultrasonic patterns from the received ultrasonic measurements;
      receive a known identification of the target characteristic,
      determine, for each of the second classifiers, an error $e_1$ between the estimated identification of the tar get characteristic and the known identification of the tar get characteristic;
      determine an error $e_2$ between the identification of the target characteristic for the first classifier and the known identification of the target characteristic; and
      update the first classifier with the second classifier having the error $e_1$ when the error $e_1$ is less than the error $e_2$.

10. The system of claim 9, further comprising a display in communication with the analyzer that is configured to display the received ultrasonic measurements and the identified target characteristic.

11. The system of claim 9, wherein the received ultrasonic measurements comprise at least one of ultrasonic amplitude as a function of time and Fourier transformations thereof.

12. The system of claim 9, wherein the target characteristic is at least one of a region within the target having a material property or an absence of a region within the target having a material property.

13. The system of claim 9, wherein the target characteristic is a geometric characteristic of the target.

* * * * *